(12) United States Patent
Wang et al.

(10) Patent No.: US 9,510,282 B2
(45) Date of Patent: Nov. 29, 2016

(54) MAC ENHANCEMENT TO SUPPORT MULTI-PERIODIC GTS ALLOCATION FOR PERSONAL AREA NETWORK (PAN) SYSTEMS

(75) Inventors: Dong Wang, Ossining, NY (US); David Hillary Evans, Crawley (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 89 days.

(21) Appl. No.: 14/240,120

(22) PCT Filed: Sep. 6, 2012

(86) PCT No.: PCT/IB2012/054601
§ 371 (c)(1),
(2), (4) Date: Feb. 21, 2014

(87) PCT Pub. No.: WO2013/035058
PCT Pub. Date: Mar. 14, 2013

(65) Prior Publication Data
US 2014/0192696 A1    Jul. 10, 2014

Related U.S. Application Data

(60) Provisional application No. 61/532,727, filed on Sep. 9, 2011, provisional application No. 61/548,754, filed on Oct. 19, 2011.

(51) Int. Cl.
*H04W 52/02* (2009.01)
*H04W 72/12* (2009.01)
*H04W 4/00* (2009.01)
*H04W 72/04* (2009.01)

(52) U.S. Cl.
CPC ......... *H04W 52/0216* (2013.01); *H04W 4/008* (2013.01); *H04W 72/0413* (2013.01); *H04W 72/1252* (2013.01)

(58) Field of Classification Search
CPC .................................................. H04W 52/0216
USPC ............................................... 370/311, 230.1
See application file for complete search history.

(56) References Cited

U.S. PATENT DOCUMENTS

2007/0258540 A1* 11/2007 Ratasuk ................. H04J 11/005
375/267
2010/0290387 A1* 11/2010 Chou ...................... H04B 1/719
370/328

(Continued)

OTHER PUBLICATIONS

"i-GAME: An Implicit GTS Allocation Mechanism in IEEE 802.15.4 for Time-Sensitive Wireless Sensor Networks" by Anis 2006.*

(Continued)

*Primary Examiner* — Dang Ton
*Assistant Examiner* — Pamit Kaur

(57) ABSTRACT

A personal area network (PAN) coordinator (26) of a medical body area network (MBAN) (36) allocates multi-periodic guaranteed time slots (GTSs) to sensor devices (12, 14) of the MBAN (36). The PAN coordinator (26) includes a controller (40) configured to receive a request for a multi-periodic GTS from a sensor device (12, 14) of the MBAN (36). The request includes a period indicating a periodicity with which the multi-periodic GTS is requested. In response to the request, the controller (40) determines a GTS allocation including a starting frame and transmits a descriptor to the sensor device (12, 14). The descriptor includes information to identify the starting frame.

20 Claims, 5 Drawing Sheets

| Bits 0-15 | Bits 16-19 | Bits 20-23 |
|---|---|---|
| Device Short Address | GTS Starting Slot | GTS Length |

(56) References Cited

U.S. PATENT DOCUMENTS

2011/0158206 A1    6/2011   Shrestha et al.
2012/0057486 A1*  3/2012   Abedi et al. .................. 370/252

OTHER PUBLICATIONS

Huang, Y-K, et al.; An Adaptive GTS Allocation Scheme for IEEE 802.15.4; 2008; IEEE Trans. on Parallel and Distributed Systems; 19(5)641-651.

Huang, Y-K., et al.; AGA: Adaptive GTS Allocation with Low Latency and Fairness considerations for IEEE 802.15.4; 2006; IEEE Trans. on Communications; pp. 3929-3934.

Koubaa, A., et al.; i-GAME: An Implicity GTS Allocation Mechanism in IEEE 802.15.4 for Time-Sensitive Wireless Sensor Networks; 2006; Real-Time Systems; pp. 183-192.

Koubaa, A., et al.; An implicit GTS allocation mechanism in IEEE 802.15.4 for time-sensitive wireless sensor networks: theory and practice; 2007; Real-Time Systems; pp. 169-204.

* cited by examiner

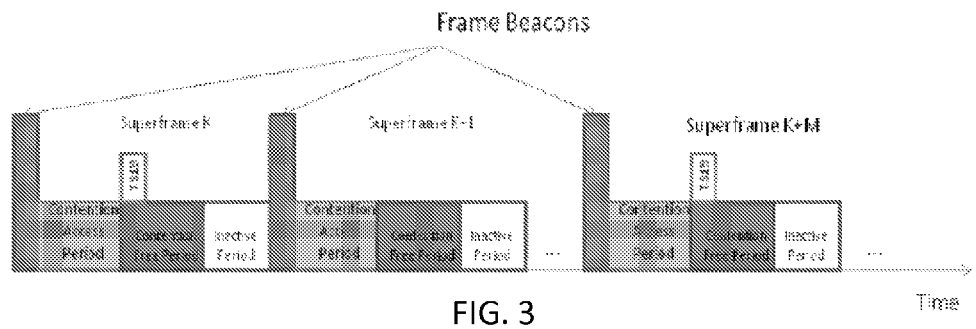
FIG. 3
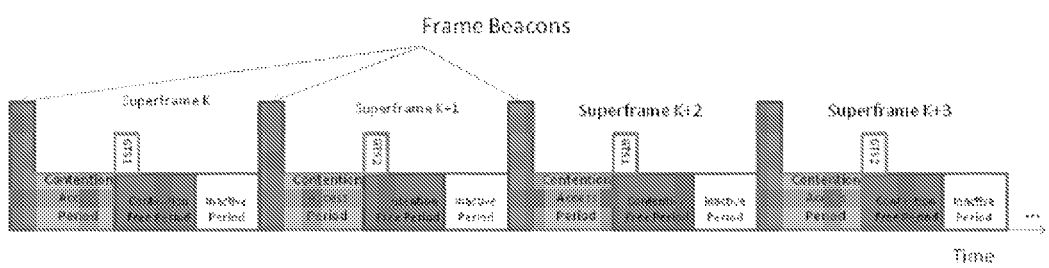
FIG. 4
| Bits 0-2 | Bits 3-6 | Bit 7 |
|---|---|---|
| GTS Descriptor Count | Reserved | GTS Permit |
FIG. 5
| Bits 0-2 | Bits 3-5 | Bit 6 | Bit 7 |
|---|---|---|---|
| GTS Descriptor Count | Reserved | m-periodic GTS Permit | GTS Permit |
FIG. 6

| (bit 7, bit 6) | Legacy GTS Permit | M-periodic Permit |
|---|---|---|
| (0, 0) | No | No |
| (0, 1) | Reserved ||
| (1, 0) | Yes | No |
| (1, 1) | Yes | Yes |

FIG. 7

| 7 Octets | 1 Octet | 1 Octet |
|---|---|---|
| MHR fields | Command Frame Identifier | GTS characteristics |

FIG. 8

| Bits 0-3 | Bit 4 | Bit 5 | Bits 6 & 7 |
|---|---|---|---|
| GTS Length | GTS Direction | Characteristics Type | Reserved |

FIG. 9

| Bits 0-3 | Bit 4 | Bit 5 | Bit 6 | Bit 7 |
|---|---|---|---|---|
| GTS Length | GTS Direction | Characteristics Type | m-periodic Request indicator | Reserved |

FIG. 10

| 7 Octets | 1 Octet | 1 Octet | 1 Octet |
|---|---|---|---|
| MHR fields | Command Frame Identifier | GTS characteristics | M-periodic GTS characteristics |

| Bits 0-3 | Bits 4-7 |
|---|---|
| Starting superframe offset range | M-periodic GTS period order |

| Bits 0-15 | Bits 16-19 | Bits 20-23 |
|---|---|---|
| Device Short Address | GTS Starting Slot | GTS Length |

| Bits 0-15 | Bits 16-19 | Bits 20-23 |
|---|---|---|
| Device Short Address | GTS Starting Slot | GTS Starting BSN |

MAC ENHANCEMENT TO SUPPORT MULTI-PERIODIC GTS ALLOCATION FOR PERSONAL AREA NETWORK (PAN) SYSTEMS

CROSS REFERENCE TO RELATED APPLICATIONS

This application is a national filing of PCT application Serial No. PCT/IB2012/054601, filed Sep. 6, 2012, published as WO 2013/035053 A1 on Mar. 14, 2013, which claims the benefit of U.S. provisional application Ser. No. 61/532,727 filed Sep. 9, 2011 and U.S. provisional application Ser. No. 61/548,754 filed Oct. 19, 2011, both of which are incorporated herein by reference.

The present application relates generally to wireless communication. It finds particular application in conjunction with medical body area networks (MBANs) and will be described with particular reference thereto. However, it is to be understood that it also finds application in other usage scenarios and is not necessarily limited to the aforementioned application.

There is a general trend in the healthcare industry towards expanding care services, such as patient monitoring, to general wards and even beyond the physical hospital boundaries. Medical body area networks (MBANs) (a.k.a., wireless body area networks) are one of the key enabling technologies for ubiquitous monitoring services. An MBAN is a wireless network of sensors around a patient used for monitoring a patient's physiological data. The clinical benefits of MBANs include: extension of monitoring into care areas that are currently unmonitored; improved healthcare workflow efficiency, safety and clinical outcome; patient mobility, comfort, and infection control; monitoring flexibility and scalability; and reduced overall monitoring costs. This is not intended to be an exhaustive list of benefits.

With reference to FIG. 1, a typical MBAN system includes several tiny sensor devices placed on a patient's body to capture physiological data of the patient, such as heart rate and electriocardiogram (ECG) signals. The captured data is forwarded to a hub device through a short-range and low-power MBAN. The hub device could be a local bedside monitoring unit, a cell phone, a set-top-box, or other wireless device and usually has a connection to a backhaul network (e.g., a cellular network, a LAN, etc.), through which the collected data is further transferred to a central monitoring system. The central monitoring system is responsible for analyzing patients' physiological data and provides monitoring, diagnosing or treating services in real time.

Currently, the Institute of Electrical and Electronics Engineers (IEEE) is developing wireless communication standards for MBAN applications. One example is the IEEE 802.15.4j standard in which physical (PHY)/media access control (MAC) layer enhancement features are under development to extend widely used IEEE 802.15.4 radios to better serve MBAN applications. In the IEEE 802.15.4-2006 standard, a guaranteed time slot (GTS) mechanism is defined to allow a device to operate on the channel within a portion of the superframe that is dedicated exclusively to that device. GTSs form a contention-free period (CFP), which always appear at the end of the active superframe, as shown in FIG. 2. Such a GTS scheme provides a good data transfer solution for MBAN applications that have regular, periodic data traffic and strict latency requirements, like ECG monitoring application.

A device can request the allocation of a new GTS from a personal area network (PAN) coordinator, typically the hub device, through the MAC sublayer management entity (MLME)-GTS request primitive, with the GTS characteristics set according to the requirements of the intended application. Once a GTS request is received, the PAN coordinator sends an ACK to acknowledge receipt of the GTS request. The PAN coordinator also checks if it has enough resource to support the new GTS allocation and makes a decision as to whether to allocate the requested GTS. If the allocation can be made, the PAN coordinator broadcasts the allocated GTS information as part of a GTS descriptor (including the starting time slot and the slot length) in its beacon frame for aGtsDescPersistenceTime superframes. On receipt of the acknowledgment to the GTS request command, the device continues to track beacons and waits for at most aGtsDescPersistenceTime superframes. If no GTS descriptor for itself is received, the device assumes that its GTS request failed. Otherwise, the device uses the information included in its GTS descriptor to locate its GTS time slots.

One challenge with the GTS scheme defined in the current IEEE 802.15.4 specification is that it may not be able to support low duty cycle MBAN applications, like heart rate monitoring applications, efficiently in terms of time slot usage and power consumption. The allocation of a GTS means that the allocated time slots are exclusively reserved for its owner device to communicate with the PAN coordinator in every superframe after the allocation. For example, if the PAN coordinator grants a GTS allocation of time slot 6 to device A and starts broadcasting the GTS descriptor of that allocation in its beacon frame of superframe K, then time slot 6 of superframe N>=K (i.e., N=K, K+1, K+2, . . . ) will be reserved for operations of device A.

For low duty cycle MBAN applications, such as blood pressure monitoring and heart rate monitoring, the IEEE 802.15.4 GTS scheme may not be efficient. With a very low data rate or duty cycle, a device in those applications may only need to communicate with the PAN coordinator for a very short time period over a long time interval. That means a device can stay in "sleep" mode for most superframes and only wake up in its GTS slots to do communication every tens or even hundreds of superframes. This feature is very important to MBAN applications since it can greatly prolong the battery life of a device by putting the device in "sleep" mode for most of time.

However, the IEEE 802.15.4 GTS scheme reserves the allocated time slots of every superframe following the allocation exclusively for the use of a device even though the device doesn't need to communicate every superframe. Hence, the IEEE 802.15.4 GTS scheme does not use the time slots efficiently. This is especially true for a device that only uses the allocated time slots every tens or even hundreds of superframes. Moreover, to maintain its GTS allocation, a device may have to wake up and do some dummy communication with the PAN coordinator even though the device doesn't have useful data to transfer. Otherwise, the PAN coordinator may assume the device lost its communication link and will release its GTS allocation. This will unnecessarily increase the "wake-up" time of the device and greatly decrease its battery life, which is unacceptable to MBAN applications.

The present application provides a new and improved method which overcomes the above-referenced problems and others.

In accordance with one aspect, a personal area network (PAN) coordinator of a medical body area network (MBAN) allocates multi-periodic guaranteed time slots (GTSs) to sensor devices of the MBAN. The PAN coordinator includes a controller configured to receive a request for a multi-periodic GTS from a sensor device of the MBAN. The request includes a period indicating a periodicity with which the multi-periodic GTS is requested. In response to the request, the controller determines a GTS allocation including a starting frame and transmits a descriptor to the sensor device. The descriptor includes information to identify the starting frame.

In accordance with another aspect, a method allocates multi-periodic guaranteed time slots (GTSs) to sensor devices of a medical body area network (MBAN). The method includes receiving a request for a multi-periodic GTS from a sensor device of the MBAN. The request includes a period indicating a periodicity with which the multi-periodic GTS is requested. A GTS allocation, including a starting frame, for the request is determined and a descriptor is transmitted to the sensor device. The descriptor includes information to identify the starting frame.

In accordance with another aspect, a frame structure is employed for transmitting data over a medical body area network (MBAN) from a sensor device to a hub device. The frame structure supports multi-periodic guaranteed time slots (GTSs) and includes a contention access period according to IEEE 802.15.4 and a contention free period including a plurality of GTSs. A GTS of the plurality of GTSs includes an allocation to a sensor device, the allocation including a period indicating a periodicity with which the GTS is allocated to the sensor device.

One advantage resides in reduced battery consumption for MBAN devices.

Another advantage resides in improved efficiency in GTS allocation.

Another advantage resides in backwards compatibility.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 3 illustrates a superframe structure with multi-periodic GTSs.

FIG. 4 illustrates a superframe structure with multi-periodic GTSs and time-sharing between sensor devices.

FIG. 5 illustrates the IEEE 802.15.4 GTS specification field.

FIG. 6 illustrates a variant of the IEEE 802.15.4 GTS specification field which is modified for multi-periodic GTS allocation.

FIG. 7 illustrates a table of possible combinations of GTS permit and multi-periodic GTS permit flags and whether each combination supports legacy GTS allocation and multi-periodic GTS allocation.

FIG. 8 illustrates the IEEE 802.15.4 GTS request command.

FIG. 9 illustrates the IEEE 802.15.4 GTS characteristics field.

FIG. 10 illustrates a variant of the IEEE 802.15.4 GTS characteristics field which is modified for multi-periodic GTS allocation.

Figure 1:
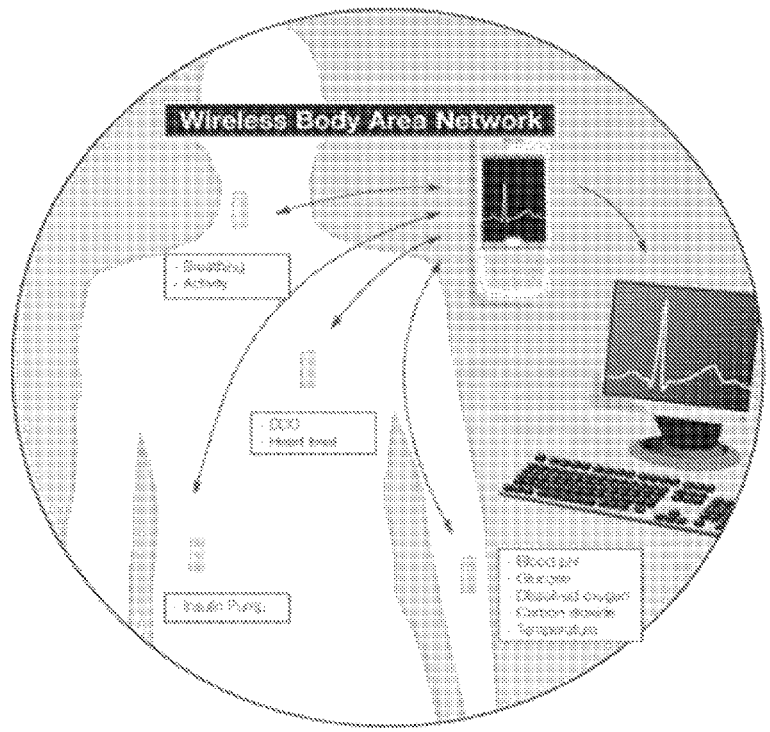
FIG. 1 illustrates a MBAN system.
Figure 2:
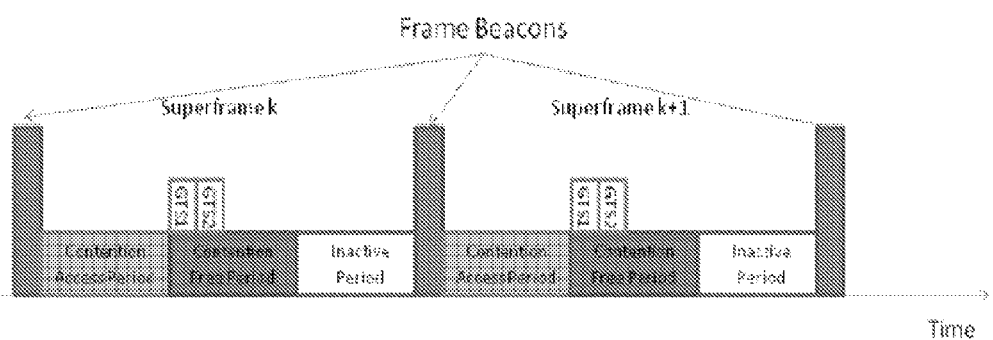
FIG. 2 illustrates a superframe structure with GTSs.

A multi-periodic GTS allocation with a period of M (M>1) starting from superframe K means the allocated time slot(s) are exclusively reserved for the device to communicate with the PAN coordinator every M superframes starting from superframe K (i.e., N=K, K+M, K+2M, K+3M, . . . ), as shown in FIG. 3. With multi-periodic GTS allocation, a sensor device can pick up a proper period M based on its data traffic, such that it only needs to wake up for communication when it has data to transfer. Therefore, the multi-periodic GTS allocation can improve battery life of a sensor device in low duty cycle MBAN applications.

Furthermore, for the superframes with N≠K, K+M, K+2M, K+3M, . . . , the allocated time slot(s) are available for GTS allocations to other devices. In other words, multiple GTS allocations for different devices can use the same time slot(s) in a time sharing way. One example is given in FIG. 4, where GTS1 and GTS2, both of which have M=2, share the same time slot. In superframe N=K+2*i, i=0, 1, . . . , the allocated time slot is used for GTS1, while in superframe N=K+1+2*i, i=0, 1, . . . , the same allocated time slot is used for GTS2. Therefore, the GTS time slot resources are used more efficiently with multi-periodic GTS allocation.

In view of the foregoing, a multi-periodic GTS allocation scheme is added to IEEE 802.15.4 to improve the efficiency of IEEE 802.15.4 for low duty-cycle MBAN applications. New GTS specification and GTS request commands are defined to support multi-periodic GTS allocation request/grant operations, as described below. The multi-periodic GTS allocation scheme advantageously achieves good legacy compatibility with current IEEE 802.15.4 devices/implementations, which allows new IEEE 802.15.4j devices and legacy IEEE 802.15.4 devices to work in the same MBANs.

The MAC enhancement to IEEE 802.15.4 uses one reserved bit of the GTS specification field transmitted in beacon frames to indicate whether multi-periodic GTS allocation is supported by the PAN coordinator. The current IEEE 802.15.4 GTS specification field is defined as shown in the FIG. 5. The field includes 8 bits, where bits 0-2 are employed for a GTS descriptor count, bits 3-6 are reserved and bit 7 is employed for a GTS permit flag. To allow for multi-periodic GTS allocation, one of the reserved bits is employed for a multi-periodic GTS permit flag, as shown in FIG. 6. This flag indicates whether the PAN coordinator supports multi-periodic GTS allocation.

With reference to FIG. 7, a table illustrates the possible combinations of the multi-periodic GTS permit bit (bit 6) and the GTS permit bit (bit 7) and whether the combinations permit legacy GTS allocation and multi-periodic GTS allocation. Legacy GTS allocation is GTS allocation defined in IEEE 802.15.4, which allocates the time slots to a device in every superframe, and multi-periodic GTS allocation is as described above. As shown, when both the multi-periodic GTS permit bit and the GTS permit bit are '0', neither legacy GTS allocation nor multi-periodic GTS allocation are permitted. Also, when the multi-periodic GTS permit bit is '0' and the GTS permit bit is '1', legacy GTS allocation is permitted, but multi-periodic GTS allocation is not permitted. Further, when the multi-periodic GTS permit bit is '1' and the GTS permit bit is '1', legacy GTS allocation and multi-periodic GTS allocation are permitted. The combination that the multi-periodic GTS permit bit is '1' and the GTS permit bit is '0' is reserved, which means this combination is not valid and should not be used.

A PAN coordinator broadcasts whether it supports legacy GTS allocation and multi-periodic GTS allocation in its beacon frames by setting the multi-periodic GTS permit bit (bit 6) and the GTS permit bit (bit 7) properly. On receipt of beacon frames, a sensor device determines whether legacy GTS allocation or multi-periodic GTS allocation are supported by its PAN coordinator. If a device and its PAN coordinator both support multi-periodic GTS allocation, then the device can use a multi-periodic request command to request a multi-periodic GTS allocation when needed.

The MAC enhancement further uses an enhanced GTS request command. In other words, in order to support multi-periodic GTS allocation, the GTS request command is updated. The parameter M (M>1) is the requested GTS period and the parameter K specifies the first superframe that the device wants to have the allocated time slot(s) available for operation. These parameters need to be included in the GTS request command. The format for the current IEEE 802.15.4 GTS request command is illustrated in FIG. 8. The request includes 7 octets for a MAC header (MHR), 1 octet for a command frame identifer, and 1 octet for GTS characteristics. The GTS characteristics field provides information about the requested time slots and is illustrated in FIG. 9. Bits 0-3 are employed for a GTS length, bit 4 is employed for a GTS direction, bit 5 is employed for a characteristics type and bits 6 & 7 are reserved.

Figures 11, 12, 13, 14:
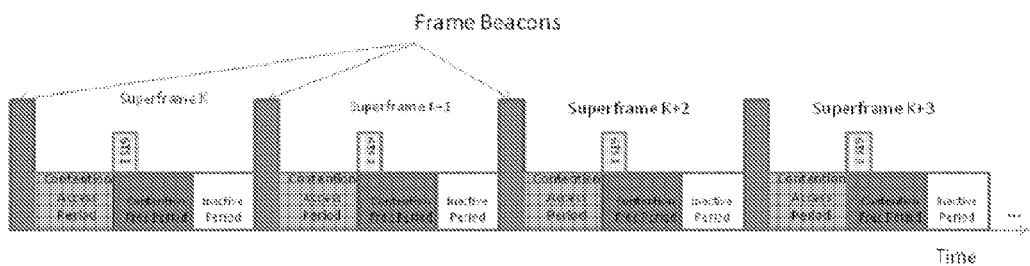
FIG. 11 illustrates a variant of the IEEE 802.15.4 GTS request command which is modified for multi-periodic GTS allocation.
FIG. 12 illustrates a multi-periodic characteristics field.
FIG. 13 illustrates a superframe structure with multi-periodic GTSs and time-sharing between sensor devices.
FIG. 14 illustrates the IEEE 801.15.4 GTS descriptor.

In order to support multi-periodic GTS request, the GTS characteristics field is modified as shown in FIG. 10. In the new format, one reserved bit (bit 6) is used as a multi-periodic request indicator. If this bit is set to '0', then the current request is an IEEE 802.15.4 legacy GTS request command. If the bit is set to '1', then the current request is a multi-periodic GTS request command and there will be one more octet following the GTS characteristics that provides the required information about the GTS period M and the starting superframe K. This new multi-periodic GTS request command with an additional octet has a format as shown in FIG. 11. The additional octet is employed for a multi-periodic GTS characteristics field. In other embodiments, the PAN coordinator can determine whether a received GTS request command is a multi-periodic GTS request command based on the length of the received GTS request command without using one reserved bit (bit 6) as a multi-periodic request indicator. If the length is 9 octets, then the GTS request command is a legacy GTS request command, while if the length is 10 octets, then the GTS request command is a multi-periodic GTS request command, The multi-periodic GTS characteristics field has a format as shown in FIG. 12 and includes two fields, a starting superframe offset range field and a multi-periodic GTS period order field. The starting superframe offset range field S occupies bits 0-3 and is greater than or equal to '0' and less than or equal to '15' (i.e., 0≤S≤15). This field indicates that the device requests to have its GTS allocation start from superframe K, which is no later than S superframes after the next superframe. S=0 indicates that the GTS allocation should start from the next superframe. The actual starting superframe K is determined by the PAN coordinator based on the current GTS slot resource status. K should satisfy 0≤K≤S. The multi-periodic GTS period order field G occupies bits 4-7 and is greater than or equal to '0' and less than or equal to '15' (i.e., 0≤G≤15). In other embodiments, the multi-periodic GTS period order field occupies bits 4-6, where 0≤G≤7. This field provides the period of the requested multi-periodic GTS allocation.

The period M is defined as $M=2^{(G+1)}$. Suitably, the period M is a power of 2 because this makes GTS management and reallocation much easier. For example, it is easy to use only one GTS time slot to support two multi-periodic GTS allocations with M=4 (GTS2 and GTS3) and one multi-periodic GTS allocation with M=2 (GTS1) in a time-sharing way, as shown in FIG. 13. In some embodiments, a complete binary tree is used to facilitate scheduling in this manner. If M is allowed to be any positive integer that is larger than 1, then it will make time sharing of a GTS time slot among multiple multi-periodic GTS allocations difficult. This, in turn, has the affect of reducing the GTS time slot usage efficiency. For example, it is impossible to share the same time slot between a multi-periodic GTS allocation with M=3 and a multi-periodic GTS allocation with M=5. Two time slots would be needed to support the two multi-periodic GTS allocations.

In some embodiments, the PAN coordinator dynamically adjusts the periods of GTS allocations when demand exceeds available GTSs. For example, if the PAN coordinator is servicing too many devices to provide all the devices the requested GTS allocations, the PAN coordinator can increase the periods of existing GTS allocations to allow all the devices to receive GTS allocations. Suitably, the lower bound on a GTS allocation is the requested period and the upper bound is set by the capabilities of the device and/or PAN coordinator.

With the above proposed update, the legacy IEEE 802.15.4 GTS request command can be reused to support a multi-periodic GTS request. Another option would be to define a new multi-periodic GTS request command with the format defined in FIG. 11. In this option, a unique command frame identifier is assigned to the multi-periodic request command. Based on the unique command frame identifier, a PAN coordinator can determine whether a received frame is a multi-periodic GTS request command and process it properly. According to either option, GTS length in the GTS characteristics field can still be used to give periodic GTS with one or more continguous slots.

Figures 15, 16:
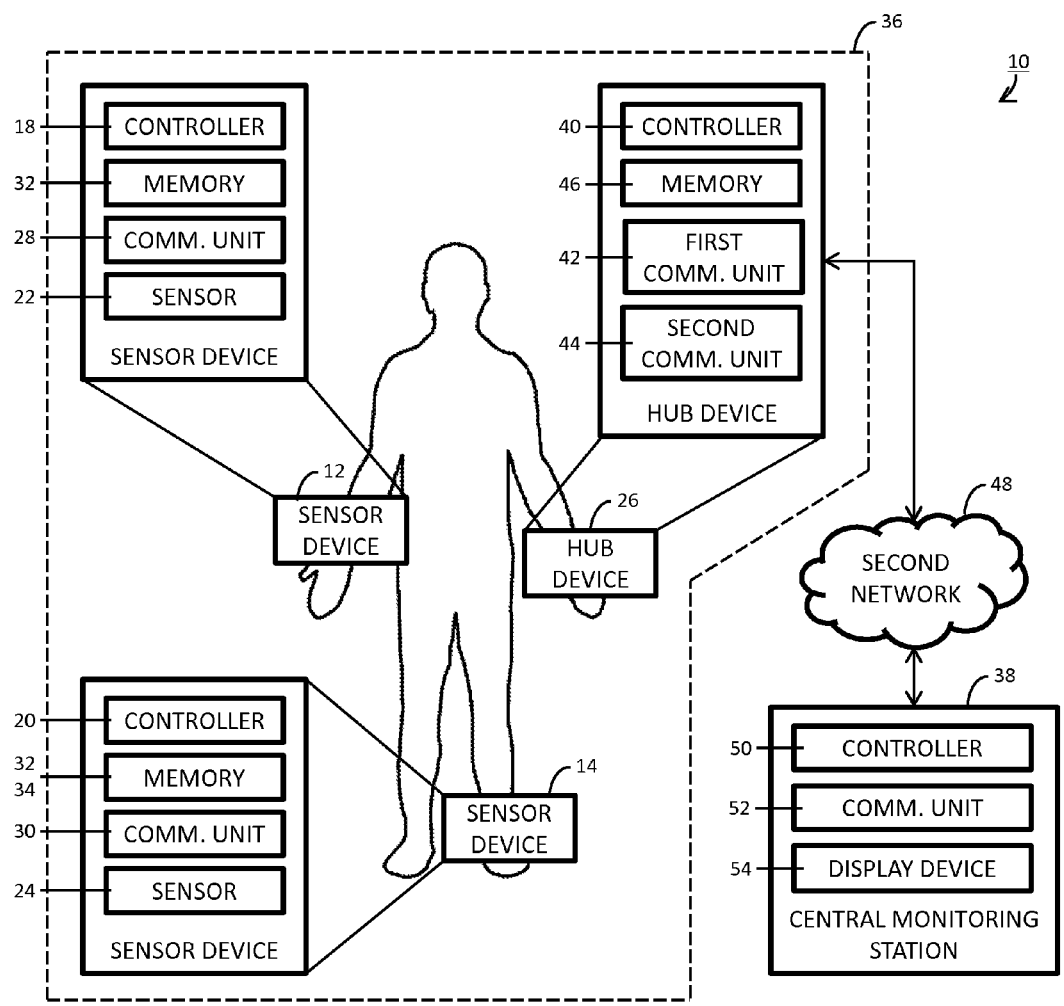
FIG. 15 illustrates the IEEE 801.15.4 GTS descriptor which is modified for multi-periodic GTS allocation.
FIG. 16 illustrates a block diagram of a MBAN system.

The MAC enhancement further uses an enhanced GTS descriptor. Once a PAN coordinator receives a multi-periodic GTS request command and decides to grant such a GTS, it generates a GTS descriptor and transmits it in its beacon frames to notify the requesting device about the granted GTS allocation. The GTS descriptor defined in IEEE 802.15.4 has a format as shown in FIG. 14. The GTS descriptor is 24 bits in size, where bits 0-15 are employed to identify a device short address, bits 16-19 are employed to specify a GTS starting slot, and bits 20-23 are employed to specify a GTS length. However, the legacy GTS description cannot provide information about the starting superframe K, which is needed for the requesting device to determine in which superframes (i.e., beacon superframe number (BSM)= K+i*M, i=0, 1, 2, . . . ) the allocated time slots are available for use. Therefore, for a GTS descriptor of a multi-periodic GTS allocation, the GTS length field is replaced with a GTS starting BSN, as shown in FIG. 15.

In the multi-periodic GTS case, the GTS length by default is the one requested by a device (i.e., the GTS length in the GTS characteristics field in the GTS request command) and is not included in the GTS descriptor. Instead, the GTS starting BSN is included there to provide the information about the starting superframe K. In some embodiments, such superframe is the first superframe after the current superframe that the periodic GTS slot is available to be used by the requesting device and that has a BSN with the four least significant bits equal to the GTS length field (bits 20-23). Based on the current superframe BSN and the GTS starting BSN field, the requesting device can calculate K. For example, if a multi-periodic GTS descriptor is transmitted in the beacon frame of superframe 26 (011010 in binary format) and its GTS starting BSN is set to 0000, then that means the starting superframe K=32 (100000) since superframe 32 is the first superframe after superframe 26 that has BSN (i.e., 32) with the four least significant bits equal to 0000. In other embodiments, the GTS length field (bits 20-23) represents an offset S ($0 \leq S \leq 15$) and the first superframe after the current superframe that the periodic GTS slot is available to be used by the requesting device is S superframes after the next superframe. S=0 indicates that the GTS allocation starts from the next superframe.

The proposed modification to the GTS descriptor keeps the length of GTS descriptor unchanged and thus keeps the length of the beacon frame structure, which is important for legacy compatibility. If the beacon structure is changed, then the legacy IEEE 802.15.4 devices cannot correctly decode the information included in the beacon frame.

In view of the foregoing, an approach for implementing multi-periodic GTS for IEEE 802.15.4 is provided. The approach requires minimal changes by making use of unused bits and redefining existing fields when periodic GTS is used. Only the GTS request reqirest an additional octet when periodic GTS is used. Because the changes are minimal, the approach allows backwards compatibility. Further, although not discussed above, it is to be understood that PAN coordinators need to store information on more than 7 GTSs since the allocation may change from one superframe to the next. Even more, detection of GTS expiration will need to take in to account periodic GTS.

With reference to FIG. 16, an MBAN system 10 employing the multi-periodic GTS variant of IEEE 802.15.4, described above, is provided. The system 10 includes a plurality of sensor devices 12, 14 that capture physiological data of an associated patient 16, such as heart rate, respiration rate, blood pressure, ECG signals, and so forth. The sensor devices 12, 14 are typically disposed on the exterior of the patient 16. However, in some embodiments, the sensor devices 12, 14 are additionally or alternatively disposed in the patient 16 and/or proximate to the patient 16.

Each of the sensor devices 12, 14 includes a controller 18, 20 and at least one sensor 22, 24 for measuring at least one physiological parameter of the patient 16. The controllers 18, 20 capture the physiological data using the sensors 22, 24 and transmit the captured physiological data to a hub device 26 using corresponding communication units 28, 30 of the sensor devices 12, 14. In some embodiments, at least one of the controllers 18, 20 buffers the captured physiological data in corresponding memories 32, 34 of the sensor devices 12, 14 until the amount of buffered physiological data exceeds a predetermined amount.

The communication units 28, 30 communicate with the hub device 26 over an MBAN 36 formed from the multi-periodic GTS variant of IEEE 802.15.4. Suitably, at least one of the sensor devices 12, 14 takes advantage of the enhancement and employs a multi-periodic GTS for communicating with the hub device 26. This sensor device includes a period M (M>1) and an identification of a start frame for the GTS allocation, which is tailored to the specific MBAN application of the sensor device. The start frame can be identified by, for example, a frame offset from the current frame or an upper bound on the frame offset from the current frame. The period and the identification are provided to the PAN coordinator of the MBAN 36 when the sensor device requests the GTS allocation.

The hub device 26 relays the captured physiological data from the sensor devices 12, 14 to a central monitoring station 38. Further, the hub device 26 typically acts as a PAN coordinator for the MBAN 36. In embodiments, where the hub device 26 does not act as a PAN coordinator, another device of the MBAN 36 does so, such as one of the sensor devices 12, 14. The hub device 26 is typically disposed proximate to the patient 16. Further, the hub device 26 is typically one of a local bedside monitoring unit, a cell phone, a set-top-box, or other wireless device.

The hub device 26 includes a controller 40 and a first communication unit 42. The first communication unit 42 communicates with the sensor devices 12, 14 using the MBAN 36, which, as noted above, is formed from a variant of the IEEE 802.15.4 specification enhanced to support multi-periodic GTS allocation. Using the first communication unit 42, the controller 40 typically acts as the PAN coordinator for the MBAN 36. In doing so, the controller 40 controls the first communication unit 42 to set up the MBAN 36, associate/disassociate the sensor device 12, 14 with the MBAN, allocate GTSs, including multi-periodic GTSs, to the sensor devices 12, 14, and so on. Suitably, controller 40 allocates a multi-periodic GTS based on a received period and identification of a start frame.

The controller 40 further receives the captured physiological data from the sensors 12, 14 using the first communication unit 42 and transmits the received physiological data to the central monitoring station 38 using a second communication unit 44 of the hub device 26. In some embodiments, upon receiving the captured physiological data, the controller 40 immediately relays it to the central monitoring station 38. In other embodiments, the controller 40 buffers the received physiological data in a memory 46 of the hub device 26 until the amount of buffered physiological data exceeds a predetermined amount. Suitably, at least one of the sensor devices 12, 14 transmits the data to the hub device 26 using a multi-periodic GTS. The second communication unit 44 of the hub device 26 communicates with the central monitoring station 38 using a second communication network 48, such as a wide area network, a local area network, and so on. The second communication network 48 can be wired and/or wireless, but is typically wireless to allow the hub device 26 to remain mobile.

The central monitoring station 38 facilitates monitoring of the patient 16 for degradation using the physiological data captured by the sensor devices 12, 14. Further, although not illustrated, the central monitoring station 38 is typically employed for monitoring the physiological data captured by sensor devices of other MBANs corresponding to other patients.

The central monitoring station 38 includes a controller 50 and a communication unit 52. The controller 50 receives the captured physiological data from the hub device 26. Upon receiving the physiological data, in some embodiments, the controller 50 determines whether to issue an alarm by matching the received physiological data to alarm criteria. For example, in some embodiments, an alarm may be issued if at least one physiological parameters exceeds thresholds. It is contemplated that the alarm criteria can take in to account the present values of physiological parameters, as well as trends of physiological parameters. Further, upon receiving the physiological data, in some embodiments, the received physiological data is displayed on a display device 54 of the central monitoring station 38.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a controller includes a memory and a processor; and a display device includes one or more of a LCD display, an LED display, a plasma display, a projection display, a touch screen display, and the like.

The invention has been described with reference to the preferred embodiments. Modifications and alterations may occur to others upon reading and understanding the preceding detailed description. For example, while the present disclosure is described in conjunction with IEEE 802.15.4, it is to be appreciated that the proposed scheme is more generally applicable to the MAC protocol of MBANs or other sensor network systems. It is intended that the invention be constructed as including all such modifications and alterations insofar as they come within the scope of the appended claims or the equivalents thereof.

The invention claimed is:

1. A personal area network (PAN) coordinator of a medical body area network (MBAN) for allocating multi-periodic guaranteed time slots (GTSs) to sensor devices of the MBAN, said PAN coordinator comprising:
a controller configured to:
receive a request for a multi-periodic GTS from a sensor device of the MBAN, said request including a period M, M being an integer larger than 1, indicating a periodicity with which the multi-periodic GTS is requested to reserve allocated time slots for the sensor device to communicate with the PAN coordinator every M frames, such that only a fraction 1/M of the frames include a GTS for the sensor devices;
determine a GTS allocation for the request, the GTS allocation including a starting frame K, where K is an integer, having an initial allocated GTS; and,
transmit a descriptor to the sensor device, the descriptor including information to identify the starting frame.

2. The PAN coordinator according to claim 1, wherein the controller is further configured to:
broadcast an indication of support for a multi-periodic GTS allocation scheme.

3. The PAN coordinator according to claim 1, wherein the controller is further configured to:
track current GTS allocations, wherein the determination is based on current GTS allocations.

4. The PAN coordinator according to claim 1, wherein the controller is further configured to:
communicate data with the sensor device every M frames starting from the starting frame K.

5. The PAN coordinator according to claim 1, wherein the period M is a power of two.

6. The PAN coordinator according to claim 1, wherein K is greater than one.

7. The PAN coordinator according to claim 1, wherein the information to identify the starting frame includes a starting beacon frame number.

8. The PAN coordinator according to claim 1, wherein the sensor device time shares the multi-periodic GTS with another sensor device.

9. The PAN coordinator according to claim 1, wherein the PAN coordinator communicates with the sensor device using IEEE 802.15.4 modified to support multi-periodic GTSs.

10. The PAN coordinator according to claim 1, wherein the PAN device receives data from the sensor device using a frame structure, the frame structure comprising:
a contention access period according to IEEE 802.15.4; and,
a contention free period including a plurality of GTSs, a GTS of the plurality of GTSs including an allocation to a sensor device, the allocation including a period indicating a frequency with which the GTS is allocated to the sensor device.

11. A personal area network (PAN) coordinator of a medical body area network (MBAN) for allocating multi-periodic guaranteed time slots (GTSs) to sensor devices of the MBAN, said PAN coordinator comprising:
a controller configured to:
receive a request for a multi-periodic GTS from a sensor device of the MBAN, said request including a period indicating a periodicity with which the multi-periodic GTS is requested to reserve allocated time slots for the sensor device to communicate with the PAN coordinator periodically in only a fraction of the frames such that only the fraction of the frames include a GTS for the sensor devices and includes an offset range for the starting frame;
determine a GTS allocation for the request, the GTS allocation including a starting frame; and,
transmit a descriptor to the sensor device, the descriptor including information to identify the starting frame.

12. A method for allocating multi-periodic guaranteed time slots (GTSs) to sensor devices of a medical body area network (MBAN), said method comprising:
receiving a request for a multi-periodic GTS from a sensor device of the MBAN, said request including a period M, M being an integer greater than 1, indicating a periodicity with which the multi-periodic GTS is requested to reserve allocated time slots for the sensor device to communicate with the PAN coordinator every M frames, such that only a fraction 1/M of the frames include a GTS for the sensor devices;
determining a GTS allocation for the request, the GTS allocation including a starting frame; and,
transmitting a descriptor to the sensor device, the descriptor including information to identify the starting frame.

13. The method according to claim 12, further including:
broadcasting an indication of support for a multi-periodic GTS allocation scheme.

14. The method according to claim 12, further including:
tracking current GTS allocations, wherein the determination is based on current GTS allocations.

15. The method according to claim 12, further including:
communicate data with the sensor device every M frames starting from the starting frame.

16. The method according to claim 12, wherein the period M is a power of two.

17. The method according to claim 12, further including:
communicating with the sensor device using IEEE 802.15.4 modified to support multi-periodic GTSs.

18. The method according to claim 12, wherein the request further includes an offset range for the starting frame.

19. The method according to claim 18, wherein the starting frame has an initial allocated GTS.

20. A non-transitory computer readable medium carrying computer code which controls one or more processing devices to perform the method according to claim 12.

* * * * *